Mar. 13, 1923.
1,448,306
E. A. LEZERT
AMUSEMENT DEVICE
Filed Sept. 2, 1922
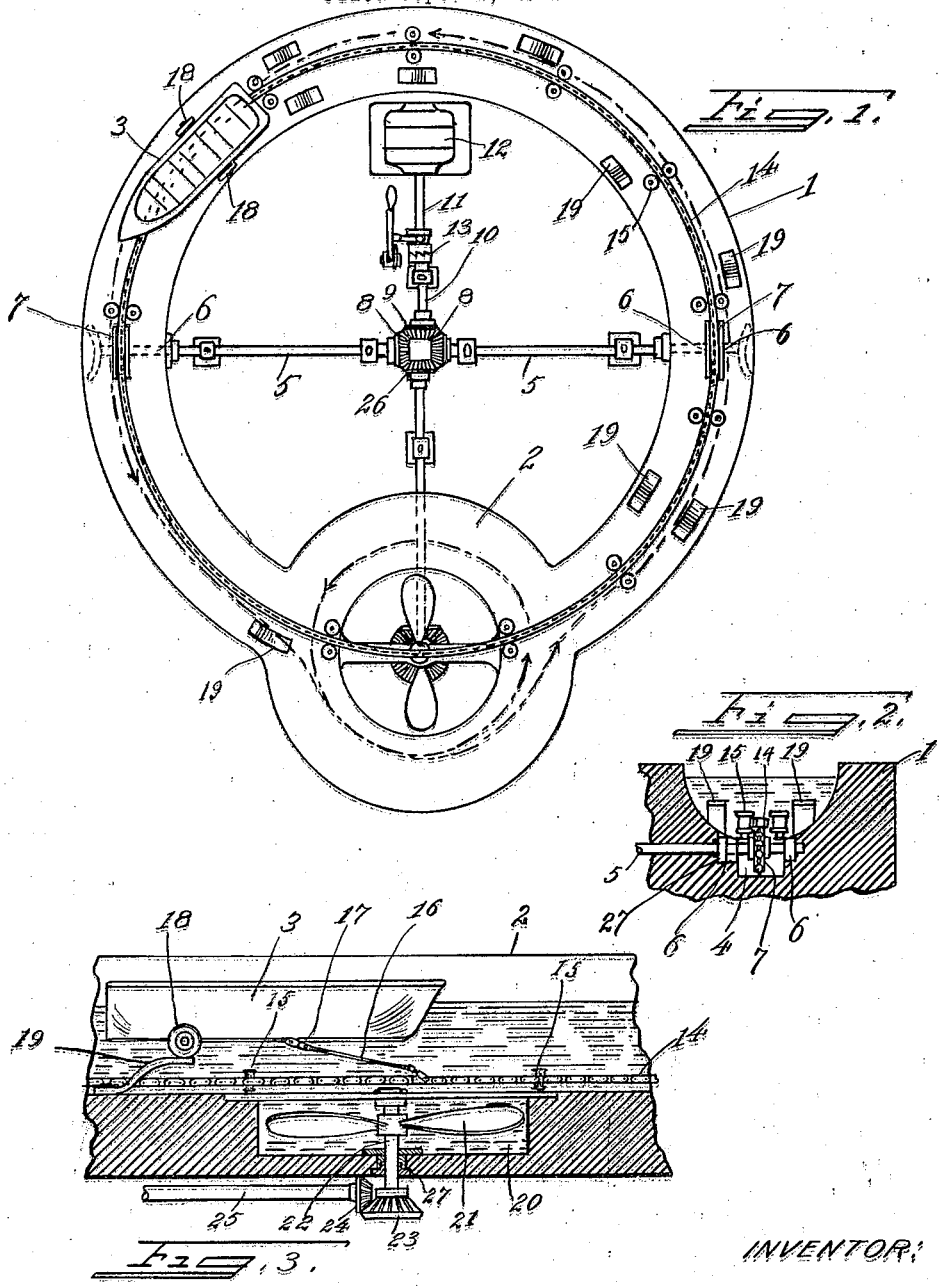
INVENTOR:
Erastus A. Lezert,
BY Arthur H. Ewald,
ATTORNEY.

Patented Mar. 13, 1923.

1,448,306

UNITED STATES PATENT OFFICE.

ERASTUS A. LEZERT, OF CINCINNATI, OHIO.

AMUSEMENT DEVICE.

Application filed September 2, 1922. Serial No. 585,897.

*To all whom it may concern:*

Be it known that I, ERASTUS A. LEZERT, a subject of the King of Great Britain, and a resident of Cincinnati, in the county of Hamilton, State of Ohio, have invented certain new and useful Improvements in Amusement Devices, of which the following is a full, clear, and exact description, reference being had to the accompanying drawings, forming a part of this specification.

My invention relates to amusement devices and has particular reference to an amusement device suitable for use in public parks and other places of amusement.

The principal object of the present invention is to provide a novel form of amusement device for use in amusement parks, in which passenger carrying boats are provided in a channel wherein the same are subjected to a variety of more or less rapid movements for the purpose of creating stimulating effects of pleasure in the passengers.

Further objects of this invention will appear from the following detailed description thereof.

In the drawings:

Figure 1 is a plan view of the invention;
Figure 2 is a cross-section of the channel;
Figure 3 is a section of the channel at the whirlpool.

The numeral 1 indicates a circular channel construction, which may be made of cement, wood or other suitable material. The channel 1 is broadened at one or more points to form a circular pool or pools 2, supplied with water for one or more boats 3. A downward groove or extension 4 extends thruout the length of the channel. Mounted on shafts 5 having bearings 6 at the sides of the groove 4, are sprocket wheels 7, of which I prefer to provide two diametrically disposed. The shafts 5 are driven by means of bevel gears 8 in mesh with a gear 9 on a shaft 10, the latter being connected with a shaft 11 of a motor 12 by means of clutch mechanism 13. Arranged to be driven by the sprocket wheels 7 is a sprocket chain or belt conveyor 14, which extends around the channel and at the bottom thereof, guide rollers 15 being provided to maintain the circular formation of the chain and to permit it to ride freely.

Each of the boats 3 is permanently attached to the sprocket chain or other conveyor 14 by means of a rope or cable 16, a swiveled coupling 17 being provided between the boat and cable. Each of the boats is also provided with a pair of wheels 18 mounted preferably to the rear of the middle of the boat; said wheels are adapted to ride on bumpers 19 mounted within the channel. Said bumpers are preferably of spring steel construction and are disposed at desired intervals thruout the channel, sometimes in pairs in radial relation in the channel and sometimes separately either near the outer or innner circumference of the channel.

Underneath the pool 2 is formed an extension 20 within which a propeller 21 mounted on a shaft 22 is arranged to operate. Shaft 22 has a bevel gear 23 which is driven by a bevel gear 24 on a shaft 25. The shaft 25 is driven by means of a beveled gear 26 intermeshing with the gears 8.

Suitable packing glands 27 prevent leakage where the shafts 5 and 22 extend into the channel.

The operation of the device is as follows:—

The boats 3 having been loaded with passengers, the clutch mechanism 13 is thrown in, which drives the sprocket chain or other conveyor 14 in the direction of the arrow in Figure 1. The movement of the chain carries with it the boats 3 which travel around the channel, the wheels traveling over the bumpers 19 at various intervals. These bumpers serve to lift the boat and give it a longitudinal rocking motion where a pair of bumpers are met, and a transverse rocking movement where individual bumpers are encountered. Simultaneously with the movement of the sprocket chain the propeller 21 is caused to rotate, thus forming a whirlpool in the circular portion 2 of the channel. When a boat enters the pool the movement of the water therein gives it a whirling motion which is permitted without twisting the cable 16 by reason of the swiveled coupling 17. In due course the boat passes out of the pool 2, drawn by the sprocket chain or other conveyor 14, and resumes its course thru the channel.

It will thus be seen that in the construction described and shown I have provided an amusement device wherein passengers in boats are subjected to a variety of more or less rapid rotary and rocking movements, all of which contribute to their sense of pleasure and enjoyment.

Having thus fully described my invention, what I claim as new and desire to secure by Letters Patent is:—

1. An amusement device comprising a channel, a vessel arranged to travel in a liquid in said channel, means for forming a whirlpool in the liquid in said channel, and means for causing said vessel to move in the liquid in said channel and thru said whirlpool.

2. An amusement device comprising a channel, a vessel arranged to travel in a liquid in said channel, means for forming a whirlpool in the liquid in said channel, means for causing said vessel to move in the liquid in said channel and thru said whirlpool, and bumpers mounted in said channel arranged to give rocking motion to said vessel.

3. An amusement device comprising a channel, a vessel arranged to travel in a liquid in said channel, means for forming a whirlpool in the liquid in said channel, means for causing said vessel to move in the liquid in said channel and thru said whirlpool, and bumpers mounted in said channel and arranged to give rocking motion to said vessel, certain of said bumpers being disposed in pairs on opposite sides of the channel, and others being disposed separately on either side of the channel.

4. An amusement device comprising a channel, a vessel arranged to travel in a liquid in said channel, means for forming a whirlpool in the liquid in said channel, a conveyor disposed along the lower portion of said channel and thru said whirlpool, means for operating said conveyor, and a swivel connection between said vessel and conveyor.

5. An amusement device comprising a channel, a vessel arranged to travel in a liquid in said channel, a conveyor disposed along the lower portion of said channel, means for operating said conveyor, a swivel connection between said vessel and conveyor, and bumpers mounted in said channel and arranged to give rocking motion to said vessel.

6. An amusement device comprising a channel, a vessel arranged to travel in a liquid in said channel, means for forming a whirlpool in the liquid in said channel, a conveyor disposed along the lower portion of said channel and thru said whirlpool, means for operating said conveyor, a swivel connection between said vessel and conveyor, and bumpers mounted in said channel and arranged to give rocking motion to said vessel.

7. An amusement device comprising a circular channel, said channel being widened at a point to form a circular pool, a vessel arranged to travel in a liquid in said channel and pool, a conveyor disposed along the lower portion of said channel and pool, means for operating said conveyor, a swivel connection between said vessel and conveyor, and means in the lower portion of said pool for causing the liquid to whirl therein.

8. An amusement device comprising a circular channel, said channel being widened at a point to form a circular pool, a vessel arranged to travel in a liquid in said channel and pool, a conveyor disposed along the lower portion of said channel and pool, means for operating said conveyor, a swivel connection between said vessel and conveyor, means in the lower portion of said pool for causing the liquid to whirl therein, and bumpers mounted in said channel and arranged to give rocking motion to said vessel.

ERASTUS A. LEZERT.